United States Patent
Yang (10) Patent No.: US 12,184,184 B2
(45) Date of Patent: Dec. 31, 2024

(54) ENERGY-RECYCLING DEVICE AND DIRECT-CURRENT (DC) VOLTAGE-BOOSTING DEVICE THEREOF

(71) Applicants: MEAN WELL Enterprises Co., Ltd., New Taipei (TW); MEAN WELL (GuangZhou) Electronics Co., Ltd., Guangzhou (CN); SUZHOU MEAN WELL TECHNOLOGY CO., LTD., Suzhou (CN)

(72) Inventor: Fanyi Yang, New Taipei (TW)

(73) Assignees: MEAN WELL ENTERPRISES CO., LTD., New Taipei (TW); MEAN WELL (GUANGZHOU) ELECTRONICS CO., LTD., Guangzhou (CN); SUZHOU MEAN WELL TECHNOLOGY CO., LTD., Suzhou (CN)

( * ) Notice: Subject to any disclaimer, the term of this patent is extended or adjusted under 35 U.S.C. 154(b) by 247 days.

(21) Appl. No.: 18/076,738

(22) Filed: Dec. 7, 2022

(65) Prior Publication Data

US 2024/0171082 A1  May 23, 2024

(30) Foreign Application Priority Data

Nov. 22, 2022 (CN) .......................... 202211466464.2

(51) Int. Cl.
*H02M 3/335* (2006.01)
*H02M 1/00* (2007.01)
*H02M 3/00* (2006.01)
*H02M 3/158* (2006.01)
*H02J 3/10* (2006.01)

(52) U.S. Cl.
CPC ......... *H02M 3/33573* (2021.05); *H02M 3/01* (2021.05); *H02M 3/1586* (2021.05); *H02J 3/10* (2013.01); *H02M 1/0043* (2021.05)

(58) Field of Classification Search
CPC .... H02M 1/0043; H02M 1/0095; H02M 3/01; H02M 3/1586; H02M 3/33573
See application file for complete search history.

(56) References Cited

U.S. PATENT DOCUMENTS

2008/0285311 A1* 11/2008 Aso .................. H02M 3/33571
  363/21.01
2014/0112026 A1* 4/2014 Pan .................. H02M 3/33571
  363/21.02

(Continued)

*Primary Examiner* — Jue Zhang
(74) *Attorney, Agent, or Firm* — Birch, Stewart, Kolasch & Birch, LLP (57) ABSTRACT

An energy-recycling device and a DC voltage-boosting device thereof is disclosed. The DC voltage-boosting device includes a first phase controller, an interleaved voltage booster, a second phase controller, and a phase-shift voltage converter. The first phase controller generates a first PWM signal and a second PWM signal. The interleaved voltage booster receives an input DC voltage, the first PWM signal and the second PWM signal and increases the input DC voltage to a supplying DC voltage. The second phase controller receives the supplying DC voltage and a setting voltage, thereby generating third PWM signals. The phase-shift voltage converter receives the third PWM signals and the supplying DC voltage and converts the supplying DC voltage into a stable DC voltage.

20 Claims, 5 Drawing Sheets

(56) References Cited

U.S. PATENT DOCUMENTS

| | | | |
|---|---|---|---|
| 2014/0268891 A1* | 9/2014 | Sigamani | H02M 1/14 |
| | | | 363/17 |
| 2019/0222129 A1* | 7/2019 | Wang | H02M 3/33571 |
| 2020/0067416 A1* | 2/2020 | Tang | H02M 3/3376 |

* cited by examiner

ENERGY-RECYCLING DEVICE AND DIRECT-CURRENT (DC) VOLTAGE-BOOSTING DEVICE THEREOF

This application claims priority of Application No. 202211466464.2 filed in China (P.R.C.) on 22 Nov. 2022 under 35 U.S.C. § 119; the entire contents of all of which are hereby incorporated by reference.

BACKGROUND OF THE INVENTION

Field of the Invention

The present invention relates to energy-recycling technology, particularly to an energy-recycling device and a direct-current (DC) voltage-boosting device thereof.

DESCRIPTION OF THE RELATED ART

Since the development of human civilization, the resulting environmental pollution and resource depletion have caused many natural disasters. Therefore, human beings have begun to attach importance to environmental protection. In order to achieve the purpose of energy saving and carbon reduction, many technology pioneers in different fields have improved and designed environmental protection functions. Among them, such as power supplies, manufacturers will find the most suitable materials for the components of the power supply, or design the most suitable modules, such as filter modules or buck-boost modules, to achieve the minimum loss and the maximum use efficiency.

In addition to the foregoing improvement directions, it can be seen that the demand for the power provided by the utility grid also increases relatively when the operating speed and frequency of electronic components continue increasing. In such a situation, the need to effectively use electricity to operate power-consuming components and avoid energy waste has also begun to receive attention. For example, in order to recycle electricity, it is common to recycle excess power from the power supply to the utility grid to save energy consumption.

Generally speaking, a power supply needs to perform a burn-in test for about 24-72 hours to verify the reliability and stability of the power supply. The conventional burn-in test system for a power supply includes a resistor tank as a load for testing the power supply. In this example, after the test power supply delivers power to the resistive tank, the power is converted into heat and then wasted. In addition to wasting power, the additional energy of the air conditioning system is consumed. In order to save energy consumption and reduce the cost of burn-in test, an energy-recycling device is usually used in the burn-in test system to avoid consuming excess energy. Most of the power supplies in the factory have a variety of output voltages. The power supplies with high and low voltage specifications need to employ two kinds of energy-recycling devices for recycling energy, which causes engineers to more inconveniently use power supplies with high and low voltage specifications in the development stage and the burn-in test stage.

To overcome the abovementioned problems, the present invention provides an energy-recycling device and a direct-current (DC) voltage-boosting device thereof, so as to solve the afore-mentioned problems of the prior art.

SUMMARY OF THE INVENTION

The present invention provides an energy-recycling device and a direct-current (DC) voltage-boosting device thereof, which widen the range of an input voltage for recycling mains power and power-saving burn-in processes.

The present invention provides a direct-current (DC) voltage-boosting device, which includes a first phase controller, an interleaved voltage booster, a second phase controller, and a phase-shift voltage converter. The first phase controller is configured to receive a constant current, a first feedback current, and a second feedback current and generate a first pulse width modulation (PWM) signal and a second pulse width modulation (PWM) signal according to the constant current, the first feedback current, and the second feedback current. The phases of the first PWM signal and the second PWM signal are different from each other. The interleaved voltage booster is coupled to the first phase controller and configured to receive an input direct-current (DC) voltage, the first PWM signal, and the second PWM signal and output the first feedback current and the second feedback current according to the input DC voltage, the first PWM signal, and the second PWM signal. The interleaved voltage booster is configured to boost the input DC voltage to a supplying direct-current (DC) voltage according to the phases of the first PWM signal and the second PWM signal. The second phase controller is coupled to the interleaved voltage booster and configured to receive the supplying DC voltage and a setting voltage and generate third pulse width modulation (PWM) signals according to the supplying DC voltage and the setting voltage. The third PWM signals have different phases. The phase-shift voltage converter is coupled to the interleaved voltage booster and the second phase controller and configured to receive the third PWM signals and the supplying DC voltage and convert the supplying DC voltage into a stable direct-current (DC) voltage according to the different phases of the third PWM signals.

In an embodiment of the present invention, the DC voltage-boosting device further includes a current controller coupled to the first phase controller and configured to generate the constant current.

In an embodiment of the present invention, the current controller is coupled to the first phase controller through a controller area network bus.

In an embodiment of the present invention, the DC voltage-boosting device further includes a voltage controller coupled to the second phase controller and configured to receive the input DC voltage and generate the setting voltage according to the input DC voltage.

In an embodiment of the present invention, the interleaved voltage booster includes a first diode, a second diode, a first electrical switch, a second electrical switch, a first inductor, a second inductor, and an output capacitor. The first electrical switch is coupled between the anode of the first diode and a grounding terminal. The control terminal of the first electrical switch is coupled to the first phase controller. The first electrical switch is configured to receive the first PWM signal to be turned on or turned off. The second electrical switch is coupled between the anode of the second diode and the grounding terminal. The control terminal of the second electrical switch is coupled to the first phase controller. The second electrical switch is configured to receive the second PWM signal to be turned on or turned off. One end of the first inductor is coupled between the anode of the first diode and the first electrical switch, and another end of the first inductor is coupled to the first phase controller. The first inductor is configured to receive the input DC voltage and generate the first feedback current and a first inductor current according to the input DC voltage. One end of the second inductor is coupled between the anode of the second diode and the second electrical switch, and another end of the second inductor is coupled to the first phase controller. The second inductor is configured to receive the input DC voltage and generate the second feedback current and a second inductor current according to the input DC voltage. One end of the output capacitor is coupled to cathodes of the first diode and the second diode and the second phase controller, and another end of the output capacitor is coupled to the grounding terminal. The output capacitor is configured to receive the first inductor current and the second inductor current through the first diode and the second diode to generate the supplying DC voltage according to the ON or OFF states of the first electrical switch and the second electrical switch.

In an embodiment of the present invention, the first phase controller includes a first subtractor, a first proportional-integral controller, a first value limiter, a first pulse width modulation (PWM) generator, a second subtractor, a second proportional-integral controller, a second value limiter, and a second pulse width modulation (PWM) generator. The first subtractor is coupled to the first inductor and configured to receive the first feedback current and the constant current and subtract the first feedback current from the constant current to generate a first current difference. The first proportional-integral controller is coupled to the first subtractor and configured to receive the first current difference and generate a first control voltage according to the first current difference. The first value limiter is coupled to the first proportional-integral controller and configured to receive the first control voltage. The first value limiter outputs the first control voltage when the first control voltage is less than a first upper limit voltage and greater than a first lower limit voltage. The first value limiter outputs the first upper limit voltage when the first control voltage is greater than or equal to the first upper limit voltage. The first value limiter outputs the first lower limit voltage when the first control voltage is less than or equal to the first lower limit voltage. The first PWM generator is coupled to the first value limiter and the control terminal of the first electrical switch and configured to receive and compare one of the first control voltage, the first upper limit voltage, and the first lower limit voltage and a first triangle waveform voltage to generate the first PWM signal. The second subtractor is coupled to the second inductor and configured to receive the second feedback current and the constant current and subtract the second feedback current from the constant current to generate a second current difference. The second proportional-integral controller is coupled to the second subtractor and configured to receive the second current difference and generate a second control voltage according to the second current difference. The second value limiter is coupled to the second proportional-integral controller and configured to receive the second control voltage. The second value limiter outputs the second control voltage when the second control voltage is less than a second upper limit voltage and greater than a second lower limit voltage. The second value limiter outputs the second upper limit voltage when the second control voltage is greater than or equal to the second upper limit voltage. The second value limiter outputs the second lower limit voltage when the second control voltage is less than or equal to the second lower limit voltage. The second PWM generator is coupled to the second value limiter and the control terminal of the second electrical switch and configured to receive and compare one of the second control voltage, the second upper limit voltage, and the second lower limit voltage and a second triangle waveform voltage to generate the second PWM signal.

In an embodiment of the present invention, the phases of the first PWM signal and the second PWM signal are different by 180 degrees.

In an embodiment of the present invention, the phase-shift voltage converter includes a resonant driving circuit, a transformer, and a rectifying circuit. The resonant driving circuit is coupled to the interleaved voltage booster and the second phase controller and configured to receive the third PWM signals and the supplying DC voltage and convert the supplying DC voltage into a resonant current according to the different phases of the third PWM signals. The primary side of the transformer is coupled to the resonant driving circuit and configured to receive the resonant current to store energy. The rectifying circuit is coupled to the secondary side of the transformer. The transformer and the rectifying circuit are configured to convert the energy into the stable DC voltage.

In an embodiment of the present invention, the resonant driving circuit includes a current switching circuit and a resonant circuit. The current switching circuit is coupled to the interleaved voltage booster and the second phase controller. The resonant circuit is coupled to the current switching circuit and the primary side of the transformer. The current switching circuit and the resonant circuit are configured to receive the third PWM signals and the supplying DC voltage and convert the supplying DC voltage into the resonant current according to the different phases of the third PWM signals.

In an embodiment of the present invention, the second phase controller includes a subtractor, a proportional-integral controller, a value limiter, and a pulse width modulation (PWM) generator. The subtractor is coupled to the interleaved voltage booster and configured to receive the supplying DC voltage and the setting voltage and subtract the supplying DC voltage from the setting voltage to generate a voltage difference. The proportional-integral controller is coupled to the subtractor and configured to receive the voltage difference and generate a phase control amount according to the voltage difference. The value limiter is coupled to the proportional-integral controller and configured to receive the phase control amount. The value limiter outputs the phase control amount when the phase control amount is less than an upper limit control amount and greater than a lower limit control amount. The value limiter outputs the upper limit control amount when the phase control amount is greater than or equal to the upper limit control amount. The value limiter outputs the lower limit control amount when the phase control amount is less than or equal to the lower limit control amount. The PWM generator is coupled to the value limiter and the current switching circuit and configured to receive the phase control amount, the upper limit control amount, or the lower limit control amount and generate the third PWM signals according to one of the phase control amount, the upper limit control amount, and the lower limit control amount and a triangle waveform voltage.

In an embodiment of the present invention, an energy-recycling device, coupled to a mains power grid, includes a first phase controller, an interleaved voltage booster, a second phase controller, a phase-shift voltage converter, and an inverter. The first phase controller is configured to receive a constant current, a first feedback current, and a second feedback current and generate a first pulse width modulation (PWM) signal and a second pulse width modulation (PWM) signal according to the constant current, the first feedback current, and the second feedback current. The phases of the first PWM signal and the second PWM signal are different from each other. The interleaved voltage booster is coupled to the first phase controller and configured to receive an input direct-current (DC) voltage, the first PWM signal, and the second PWM signal and output the first feedback current and the second feedback current according to the input DC voltage, the first PWM signal, and the second PWM signal. The interleaved voltage booster is configured to boost the input DC voltage to a supplying direct-current (DC) voltage according to the phases of the first PWM signal and the second PWM signal. The second phase controller is coupled to the interleaved voltage booster and configured to receive the supplying DC voltage and a setting voltage and generate third pulse width modulation (PWM) signals according to the supplying DC voltage and the setting voltage. The third PWM signals have different phases. The phase-shift voltage converter is coupled to the interleaved voltage booster and the second phase controller and configured to receive the third PWM signals and the supplying DC voltage and convert the supplying DC voltage into a stable direct-current (DC) voltage according to the different phases of the third PWM signals. The inverter is coupled to the phase-shift voltage converter and the mains power grid and configured to receive the stable DC voltage, convert the stable DC voltage into an alternating-current (AC) voltage, and transmit the AC voltage to the mains power grid.

In an embodiment of the present invention, the phase-shift voltage converter includes a resonant driving circuit, a transformer, and a rectifying circuit. The resonant driving circuit is coupled to the interleaved voltage booster and the second phase controller and configured to receive the third PWM signals and the supplying DC voltage and convert the supplying DC voltage into a resonant current according to the different phases of the third PWM signals. The primary side of the transformer is coupled to the resonant driving circuit and configured to receive the resonant current to store energy. The rectifying circuit is coupled to the secondary side of the transformer and the inverter. The transformer and the rectifying circuit are configured to convert the energy into the stable DC voltage.

To sum up, the energy-recycling device and the direct-current (DC) voltage-boosting device thereof employ the interleaved voltage booster and the phase-shift voltage converter to increase a voltage-boosting ratio to widen the range of an input voltage for recycling mains power and power-saving burn-in processes.

Below, the embodiments are described in detail in cooperation with the drawings to make easily understood the technical contents, characteristics and accomplishments of the present invention.

DETAILED DESCRIPTION OF THE INVENTION

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Certain terms are used throughout the description and the claims to refer to particular components. One skilled in the art appreciates that a component may be referred to using different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to encompass any indirect or direct connection. Accordingly, if this disclosure mentions that a first device is coupled with a second device, it means that the first device may be directly or indirectly connected to the second device through electrical connections, wireless communications, optical communications, or other signal connections with/without other intermediate devices or connection means.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Unless otherwise specified, some conditional sentences or words, such as "can", "could", "might", or "may", usually attempt to express what the embodiment in the present invention has, but it can also be interpreted as a feature, element, or step that may not be needed. In other embodiments, these features, elements, or steps may not be required.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the articles "a" and "the" includes the meaning of "one or at least one" of the elements or components. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. The examples in the present specification do not limit the claimed scope of the invention.

In the following description, an energy-recycling device and a direct-current (DC) voltage-boosting device thereof will be described, which employ an interleaved voltage booster and a phase-shift voltage converter to increase a voltage-boosting ratio to widen the range of an input voltage for recycling mains power and power-saving burn-in processes.

Figure 1:
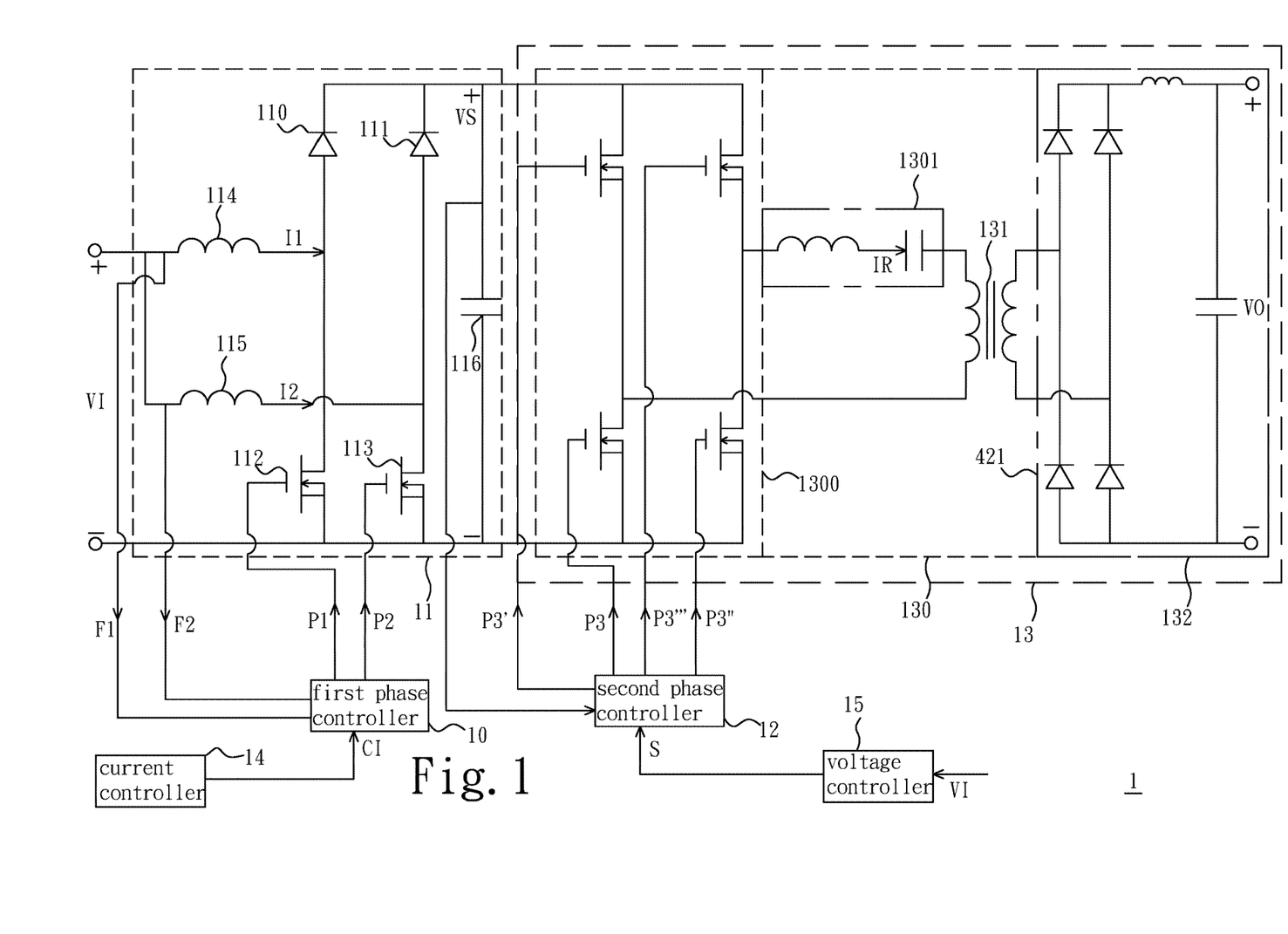
FIG. 1 is a schematic diagram illustrating a direct-current (DC) voltage-boosting device according to an embodiment of the present invention.

FIG. 1 is a schematic diagram illustrating a direct-current (DC) voltage-boosting device according to an embodiment of the present invention. Referring to FIG. 1, a DC voltage-boosting device 1 includes a first phase controller 10, an interleaved voltage booster 11, a second phase controller 12, and a phase-shift voltage converter 13. The interleaved voltage booster 11 is coupled to the first phase controller 10. The second phase controller 12 is coupled to the interleaved voltage booster 11. The phase-shift voltage converter 13 is coupled to the interleaved voltage booster 11 and the second phase controller 12.

The first phase controller 10 receives a constant current CI, a first feedback current F1, and a second feedback current F2 and generate a first pulse width modulation (PWM) signal P1 and a second pulse width modulation (PWM) signal P2 according to the constant current CI, the first feedback current F1, and the second feedback current F2. The phases of the first PWM signal P1 and the second PWM signal P2 are different from each other. For example, the phases of the first PWM signal P1 and the second PWM signal P2 can be different by 180 degrees, but the present invention is not limited thereto. The interleaved voltage booster 11 receives an input direct-current (DC) voltage VI, the first PWM signal P1, and the second PWM signal P2 and outputs the first feedback current F1 and the second feedback current F2 according to the input DC voltage VI, the first PWM signal P1, and the second PWM signal P2. The interleaved voltage booster 11 interleaved voltage booster 11 boosts the input DC voltage VI to a supplying direct-current (DC) voltage VS according to the phases of the first PWM signal P1 and the second PWM signal P2. For example, when the input DC voltage VI has a range of 12~100 V, the supplying DC voltage VS is 320 V. Thus, the voltage-boosting ratio is 26. When the input DC voltage VI is greater than 120 V, the supplying DC voltage VS is 435 V. The second phase controller 12 receives the supplying DC voltage VS and a setting voltage S and generates third pulse width modulation (PWM) signals P3, P3', P3", and P3' according to the supplying DC voltage VS and the setting voltage S. The third PWM signals P3, P3', P3", and P3' have different phases. The phase-shift voltage converter 13 receives the third PWM signals P3, P3', P3", and P3' and the supplying DC voltage VS and converts the supplying DC voltage VS into a stable direct-current (DC) voltage VO according to the different phases of the third PWM signals P3, P3', P3", and P3'. For example, when the input DC voltage VI has a range of 12~420 V, the stable DC voltage VO is 380 V. As a result, the DC voltage-boosting device 1 widens the range of the input DC voltage VI for recycling mains power and power-saving burn-in processes applied to high-voltage and low-voltage specifications.

In some embodiments of the present invention, the DC voltage-boosting device 1 may further include a current controller 14 and a voltage controller 15. The current controller 14 is coupled to the first phase controller 10. For example, the current controller 14 may be coupled to the first phase controller 10 through a controller area network bus. The current controller 14 generates the constant current CI. The voltage controller 15 is coupled to the second phase controller 12. The voltage controller 15 receives the input DC voltage VI and generates the setting voltage S according to the input DC voltage VI. When the input DC voltage VI varies, the setting voltage S varies.

The interleaved voltage booster 11 may include, but is not limited to, a first diode 110, a second diode 111, a first electrical switch 112, a second electrical switch 113, a first inductor 114, a second inductor 115, and an output capacitor 116. The first electrical switch 112 is coupled between the anode of the first diode 110 and a grounding terminal. The control terminal of the first electrical switch 112 is coupled to the first phase controller 10. The second electrical switch 113 is coupled between the anode of the second diode 111 and the grounding terminal. The control terminal of the second electrical switch 113 is coupled to the first phase controller 10. One end of the first inductor 114 is coupled between the anode of the first diode 110 and the first electrical switch 112 and another end of the first inductor 114 is coupled to the first phase controller 10. One end of the second inductor 115 is coupled between the anode of the second diode 111 and the second electrical switch 113 and another end of the second inductor 115 is coupled to the first phase controller 10. One end of the output capacitor 116 is coupled to the cathodes of the first diode 110 and the second diode 111 and the second phase controller 12 and another end of the output capacitor 116 is coupled to the grounding terminal. The first electrical switch 112 receives the first PWM signal P1 to be turned on or turned off. The second electrical switch 113 receives the second PWM signal P2 to be turned on or turned off. The first inductor 114 receives the input DC voltage VI and generates the first feedback current F1 and a first inductor current I1 according to the input DC voltage VI. The second inductor 115 receives the input DC voltage VI and generates the second feedback current F2 and a second inductor current I2 according to the input DC voltage VI. The output capacitor 116 receives the first inductor current I1 and the second inductor current I2 through the first diode 110 and the second diode 111 to generate the supplying DC voltage VS according to the ON or OFF states of the first electrical switch 112 and the second electrical switch 113.

The phase-shift voltage converter 13 may include, but is not limited to, a resonant driving circuit 130, a transformer 131, and a rectifying circuit 132. For example, the rectifying circuit 132 may include four diodes, an inductor, and a capacitor. The resonant driving circuit 130 is coupled to the output capacitor 116 of the interleaved voltage booster 11 and the second phase controller 12. The primary side of the transformer 131 is coupled to the resonant driving circuit 130. The rectifying circuit 132 is coupled to the secondary side of the transformer 131. The resonant driving circuit 130 receives the third PWM signals P3, P3', P3", and P3'" and the supplying DC voltage VS and converts the supplying DC voltage VS into a resonant current IR according to the different phases of the third PWM signals P3, P3', P3", and P3'". The transformer 131 receives the resonant current IR to store energy. The transformer 131 and the rectifying circuit 132 convert the energy into the stable DC voltage VO.

The resonant driving circuit 130 may include a current switching circuit 1300 and a resonant circuit 1301. The current switching circuit 1300 is coupled to the output capacitor 116 of the interleaved voltage booster 11 and the second phase controller 12. The resonant circuit 1301 is coupled to the current switching circuit 1300 and the primary side of the transformer 131. For example, the current switching circuit 1300 may include four electrical switches, and the resonant circuit 1301 may include an inductor and a capacitor coupled in series. The current switching circuit 1300 and the resonant circuit 1301 receive the third PWM signals P3, P3', P3", and P3'" and the supplying DC voltage VS and convert the supplying DC voltage VS into the resonant current IR according to the different phases of the third PWM signals P3, P3', P3", and P3'".

Figure 2:
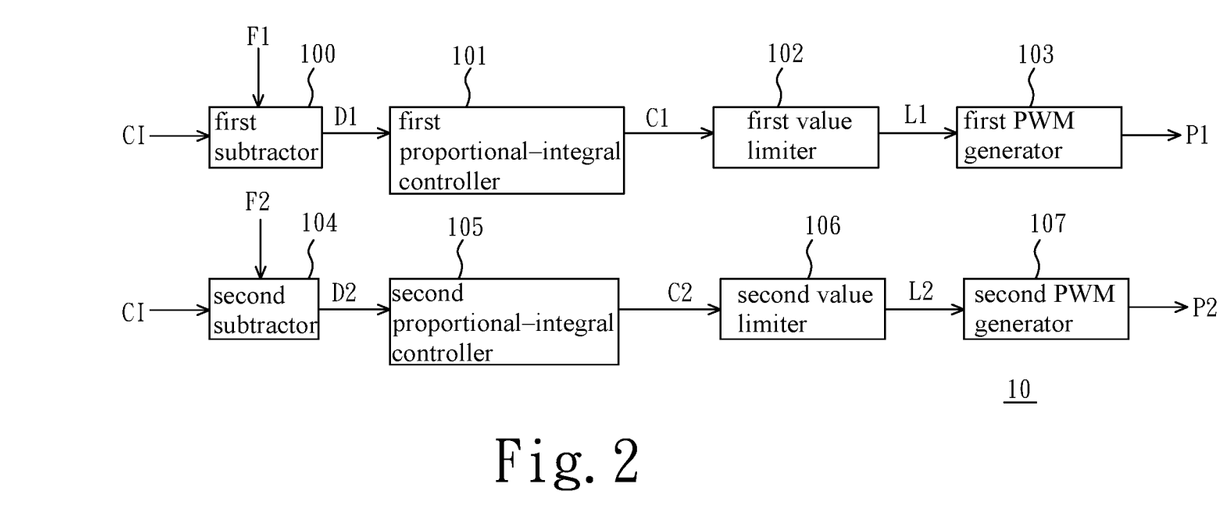
FIG. 2 is a schematic diagram illustrating a first phase controller according to an embodiment of the present invention.

FIG. 2 is a schematic diagram illustrating a first phase controller according to an embodiment of the present invention. Referring to FIG. 2 and FIG. 1, the first phase controller 10 may include, but is not limited to, a first subtractor 100, a first proportional-integral controller 101, a first value limiter 102, a first pulse width modulation (PWM) generator 103, a second subtractor 104, a second proportional-integral controller 105, a second value limiter 106, and a second pulse width modulation (PWM) generator 107. The first subtractor 100 is coupled to the first inductor 114 and the current controller 14. The first proportional-integral controller 101 is coupled to the first subtractor 100. The first value limiter 102 is coupled to the first proportional-integral controller 101. The first PWM generator 103 is coupled to the first value limiter 102 and the control terminal of the first electrical switch 112. The first subtractor 100 receives the first feedback current F1 and the constant current CI and subtracts the first feedback current F1 from the constant current CI to generate a first current difference D1. The first proportional-integral controller 101 receives the first current difference D1 and generates a first control voltage C1 according to the first current difference D1. The first value limiter 102 receives the first control voltage C1. The first value limiter 102 outputs the first control voltage C1 when the first control voltage C1 is less than a first upper limit voltage and greater than a first lower limit voltage. The first value limiter 102 outputs the first upper limit voltage when the first control voltage C1 is greater than or equal to the first upper limit voltage. The first value limiter 102 outputs the first lower limit voltage when the first control voltage C1 is less than or equal to the first lower limit voltage. The first control voltage C1, the first upper limit voltage, or the first lower limit voltage is used as a first limited voltage L1. The first PWM generator 103 receives and compares the first limited voltage L1 and a first triangle waveform voltage to generate the first PWM signal P1.

The second subtractor 104 is coupled to the second inductor 115 and the current controller 14. The second proportional-integral controller 105 is coupled to the second subtractor 104. The second value limiter 106 is coupled to the second proportional-integral controller 105. The second PWM generator 107 is coupled to the second value limiter 106 and the control terminal of the second electrical switch 113. The second subtractor 104 receives the second feedback current F2 and the constant current CI and subtracts the second feedback current F2 from the constant current CI to generate a second current difference D2. The second proportional-integral controller 105 receives the second current difference D2 and generates a second control voltage C2 according to the second current difference D2. The second value limiter 106 receives the second control voltage C2. The second value limiter 106 outputs the second control voltage C2 when the second control voltage C2 is less than a second upper limit voltage and greater than a second lower limit voltage. The second value limiter 106 outputs the second upper limit voltage when the second control voltage C2 is greater than or equal to the second upper limit voltage. The second value limiter 106 outputs the second lower limit voltage when the second control voltage C2 is less than or equal to the second lower limit voltage. The second control voltage C2, the second upper limit voltage, or the second lower limit voltage is used as a second limited voltage L2. The second PWM generator receives and compares the second limited voltage L2 and a second triangle waveform voltage to generate the second PWM signal P2.

Figure 3:
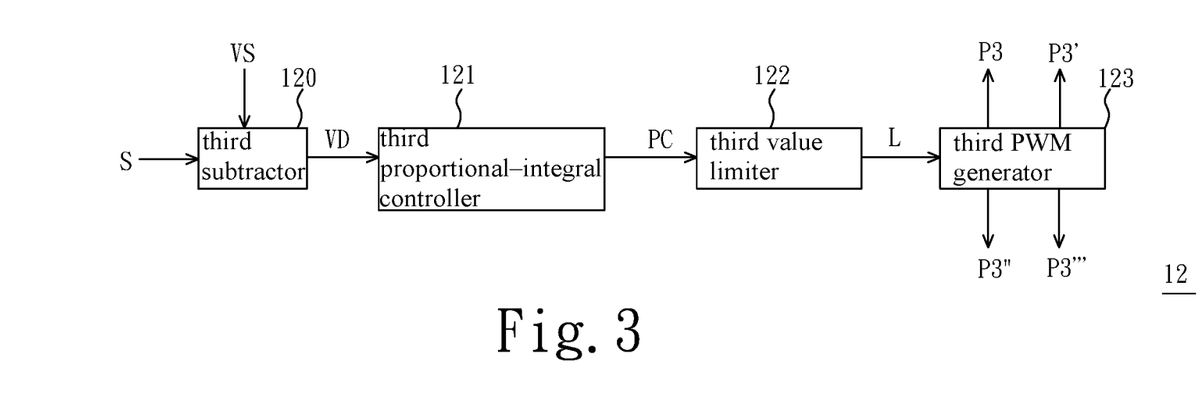
FIG. 3 is a schematic diagram illustrating a second phase controller according to an embodiment of the present invention.

FIG. 3 is a schematic diagram illustrating a second phase controller according to an embodiment of the present invention. The second phase controller 12 may include, but is not limited to, a third subtractor 120, a third proportional-integral controller 121, a third value limiter 122, and a third pulse width modulation (PWM) generator 123. The third subtractor 120 is coupled to the voltage controller 15 and the output capacitor 116 of the interleaved voltage booster 11. The third proportional-integral controller 121 is coupled to the third subtractor 120. The third value limiter 122 is coupled to the third proportional-integral controller 121. The third PWM generator 123 is coupled to the third value limiter 122 and the current switching circuit 1300. The third subtractor 120 receives the supplying DC voltage VS and the setting voltage S and subtracts the supplying DC voltage VS from the setting voltage S to generate a voltage difference VD. The third proportional-integral controller 121 receives the voltage difference VD and generates a phase control amount PC according to the voltage difference VD. The third value limiter 122 receives the phase control amount PC. The value limiter 122 outputs the phase control amount PC when the phase control amount PC is less than an upper limit control amount and greater than a lower limit control amount. The value limiter 122 outputs the upper limit control amount when the phase control amount PC is greater than or equal to the upper limit control amount. The value limiter 122 outputs the lower limit control amount when the phase control amount PC is less than or equal to the lower limit control amount. The phase control amount PC, the upper limit control amount, or the lower limit control amount is used as a limited control amount L. The third PWM generator 123 receives the limited control amount L and generates the third PWM signals P3, P3', P3", and P3'" according to the limited control amount L and a triangle waveform voltage. For example, the average of the maximum value and the minimum value of the triangle waveform voltage is used as a middle voltage value. The triangle waveform voltage is defined as a third triangle waveform voltage. The phase of the first triangle waveform voltage is shifted by the limited control amount L to form a fourth triangle waveform voltage. The third PWM generator 123 compares the middle voltage value with the third triangle waveform voltage to generate the third PWM signals P3 and P3'. The phases of the third PWM signals P3 and P3' are different by 180 degrees. The third PWM generator 123 compares the middle voltage value with the fourth triangle waveform voltage to generate the third PWM signals P3" and P3'. The phases of the third PWM signals P3" and P3'" are different by 180 degrees.

Figure 4:
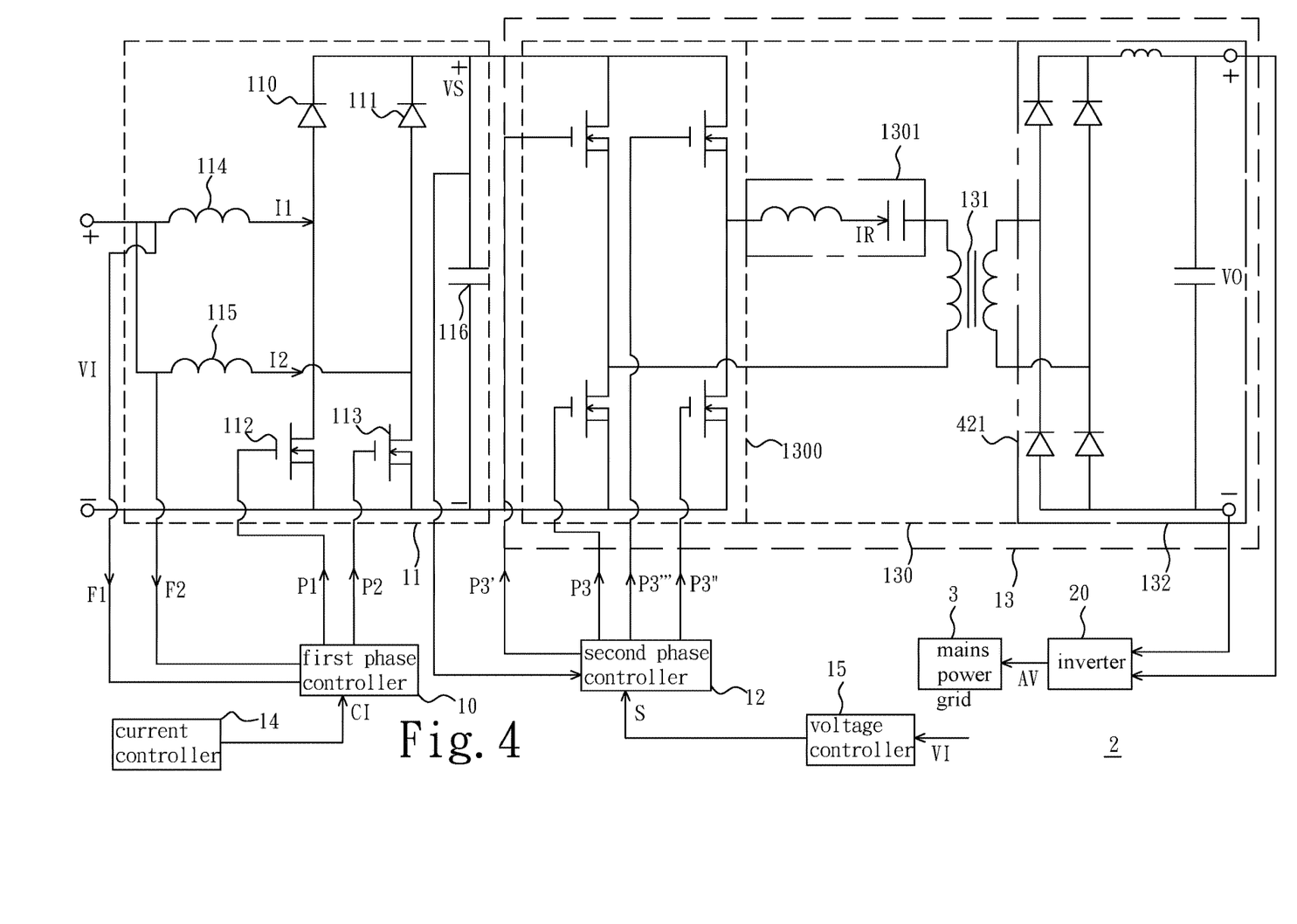
FIG. 4 is a schematic diagram illustrating an energy-recycling device according to an embodiment of the present invention.

FIG. 4 is a schematic diagram illustrating an energy-recycling device according to an embodiment of the present invention. Referring to FIG. 4, an energy-recycling device 2 includes all the components of the DC voltage-boosting device and an inverter 20. The energy-recycling device 2 is coupled to a mains power grid 3. The DC voltage-boosting device has been described previously so it will not be reiterated. The inverter 20 is coupled to the rectifying circuit 132 of the phase-shift voltage converter 13 and the mains power grid 3. The inverter 20 receives the stable DC voltage VO, converts the stable SC voltage VO into an alternating-current (AC) voltage AV, and transmits the AC voltage AV to the mains power grid 3.

Figure 5:
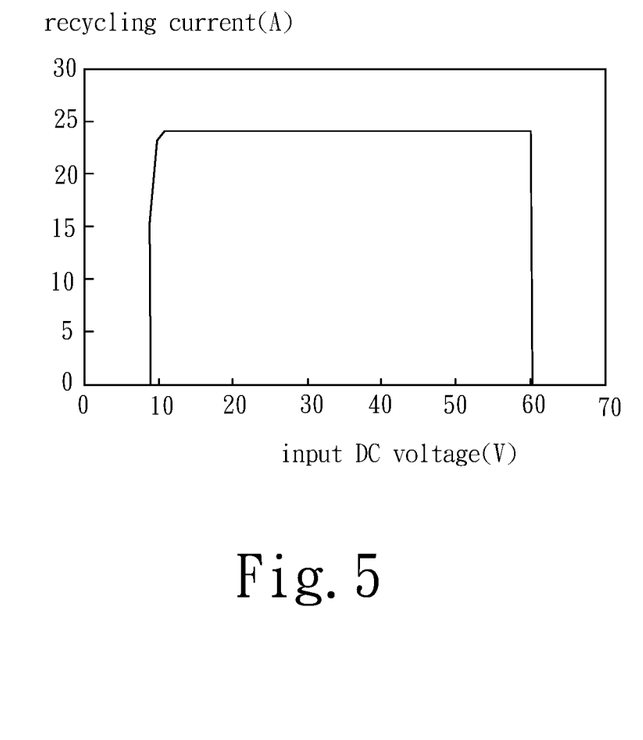
FIG. 5 is a diagram illustrating the curve of recycling current versus input direct-current (DC) voltage according to an embodiment of the present invention.
Figure 6:
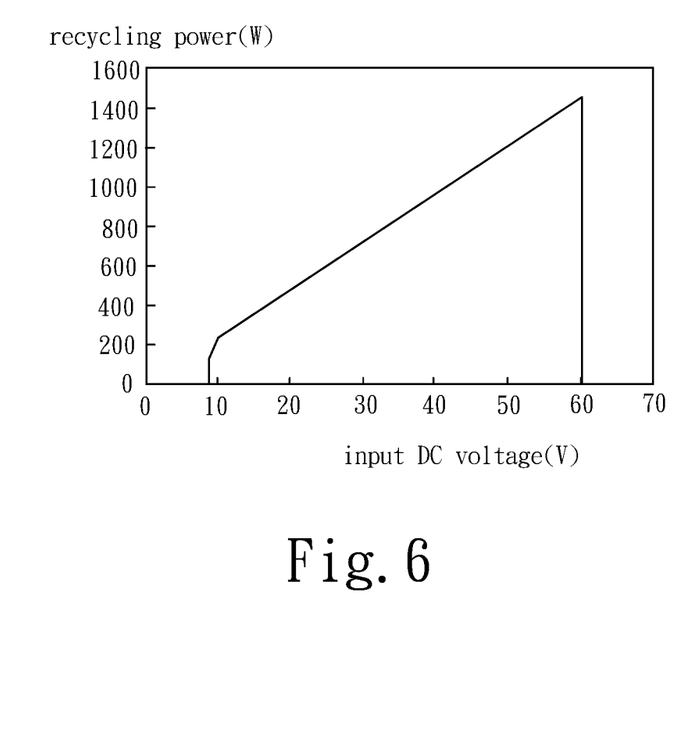
FIG. 6 is a diagram illustrating the curve of recycling power versus input DC voltage according to an embodiment of the present invention.

FIG. 5 is a diagram illustrating the curve of recycling current versus input direct-current (DC) voltage according to an embodiment of the present invention. FIG. 6 is a diagram illustrating the curve of recycling power versus input DC voltage according to an embodiment of the present invention. The recycling current and the recycling power correspond to the stable DC voltage. As illustrated in FIG. 5 and FIG. 6, the recycling current has a constant current rated value of 24 A when the input DC voltage is 1260 V. The recycling current is less than the current rated value when the input DC voltage is less than 12 V. The voltage-boosting ratio is 26 when the input DC voltage is increased to 320 V by the current rated value.

Figure 7:
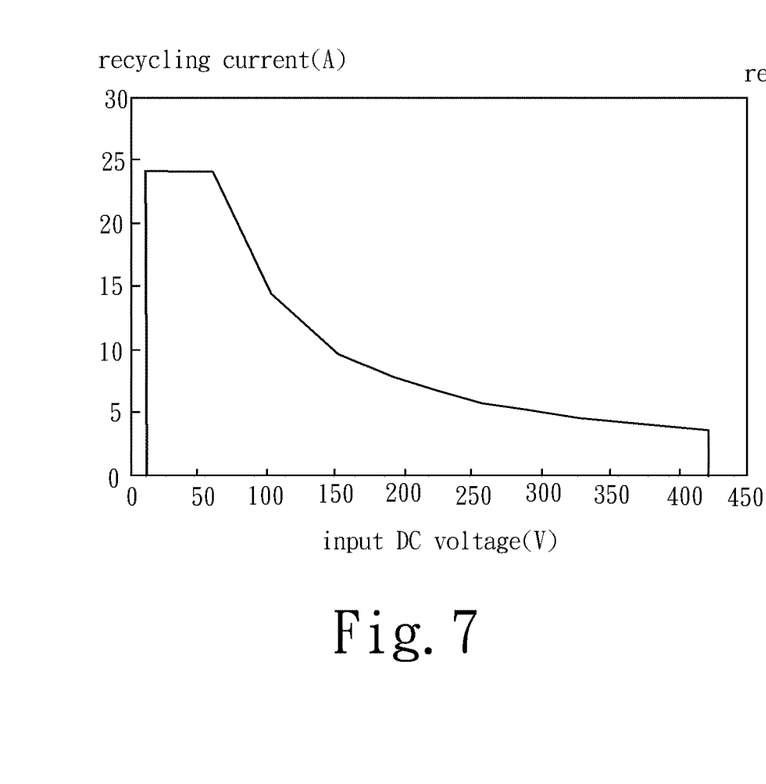
FIG. 7 is a diagram illustrating the curve of recycling current versus input DC voltage according to another embodiment of the present invention.
Figure 8:
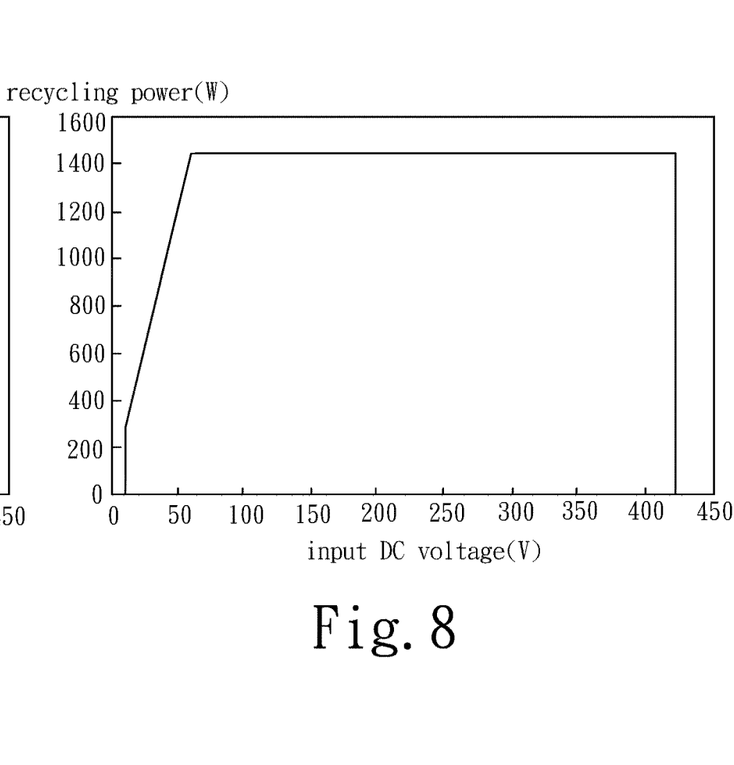
FIG. 8 is a diagram illustrating the curve of recycling power versus input DC voltage according to another embodiment of the present invention.

FIG. 7 is a diagram illustrating the curve of recycling current versus input DC voltage according to another embodiment of the present invention. FIG. 8 is a diagram illustrating the curve of recycling power versus input DC voltage according to another embodiment of the present invention. As illustrated in FIG. 7 and FIG. 8, the recycling current is decreased and the power output is fixed by the rated power when the input DC voltage has a range of 60~420 V.

According to the embodiments provided above, the energy-recycling device and the DC voltage-boosting device employ the interleaved voltage booster and the phase-shift voltage converter to increase the voltage-boosting ratio to widen the range of an input voltage for recycling mains power and power-saving burn-in processes.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A direct-current (DC) voltage-boosting device comprising:
    a first phase controller configured to receive a constant current, a first feedback current, and a second feedback current and generate a first pulse width modulation (PWM) signal and a second pulse width modulation (PWM) signal according to the constant current, the first feedback current, and the second feedback current, wherein phases of the first PWM signal and the second PWM signal are different from each other;
    an interleaved voltage booster coupled to the first phase controller and configured to receive an input direct-current (DC) voltage, the first PWM signal, and the second PWM signal and output the first feedback current and the second feedback current according to the input DC voltage, the first PWM signal, and the second PWM signal, wherein the interleaved voltage booster is configured to boost the input DC voltage to a supplying direct-current (DC) voltage according to the phases of the first PWM signal and the second PWM signal;
    a second phase controller coupled to the interleaved voltage booster and configured to receive the supplying DC voltage and a setting voltage and generate third pulse width modulation (PWM) signals according to the supplying DC voltage and the setting voltage, wherein the third PWM signals have different phases; and
    a phase-shift voltage converter coupled to the interleaved voltage booster and the second phase controller and configured to receive the third PWM signals and the supplying DC voltage and convert the supplying DC voltage into a stable direct-current (DC) voltage according to the different phases of the third PWM signals.

2. The DC voltage-boosting device according to claim 1, further comprising a current controller coupled to the first phase controller and configured to generate the constant current.

3. The DC voltage-boosting device according to claim 2, wherein the current controller is coupled to the first phase controller through a controller area network bus.

4. The DC voltage-boosting device according to claim 1, further comprising a voltage controller coupled to the second phase controller and configured to receive the input DC voltage and generate the setting voltage according to the input DC voltage.

5. The DC voltage-boosting device according to claim 1, wherein the interleaved voltage booster comprises:
    a first diode and a second diode;
    a first electrical switch coupled between an anode of the first diode and a grounding terminal, wherein a control terminal of the first electrical switch is coupled to the first phase controller, and the first electrical switch is configured to receive the first PWM signal to be turned on or turned off;
    a second electrical switch coupled between an anode of the second diode and the grounding terminal, wherein a control terminal of the second electrical switch is coupled to the first phase controller, and the second electrical switch is configured to receive the second PWM signal to be turned on or turned off;
    a first inductor with an end thereof coupled between the anode of the first diode and the first electrical switch, and another end of the first inductor is coupled to the first phase controller, wherein the first inductor is configured to receive the input DC voltage and generate the first feedback current and a first inductor current according to the input DC voltage;
    a second inductor with an end thereof coupled between the anode of the second diode and the second electrical switch, and another end of the second inductor is coupled to the first phase controller, wherein the second inductor is configured to receive the input DC voltage and generate the second feedback current and a second inductor current according to the input DC voltage; and
    an output capacitor with an end thereof coupled to cathodes of the first diode and the second diode and the second phase controller, and another end of the output capacitor is coupled to the grounding terminal, wherein the output capacitor is configured to receive the first inductor current and the second inductor current through the first diode and the second diode to generate the supplying DC voltage according to ON or OFF states of the first electrical switch and the second electrical switch.

6. The DC voltage-boosting device according to claim 5, wherein the first phase controller comprises:
a first subtractor coupled to the first inductor and configured to receive the first feedback current and the constant current and subtract the first feedback current from the constant current to generate a first current difference;
a first proportional-integral controller coupled to the first subtractor and configured to receive the first current difference and generate a first control voltage according to the first current difference;
a first value limiter coupled to the first proportional-integral controller and configured to receive the first control voltage, wherein the first value limiter outputs the first control voltage when the first control voltage is less than a first upper limit voltage and greater than a first lower limit voltage, the first value limiter outputs the first upper limit voltage when the first control voltage is greater than or equal to the first upper limit voltage, and the first value limiter outputs the first lower limit voltage when the first control voltage is less than or equal to the first lower limit voltage;
a first pulse width modulation (PWM) generator coupled to the first value limiter and the control terminal of the first electrical switch and configured to receive and compare one of the first control voltage, the first upper limit voltage, and the first lower limit voltage and a first triangle waveform voltage to generate the first PWM signal;
a second subtractor coupled to the second inductor and configured to receive the second feedback current and the constant current and subtract the second feedback current from the constant current to generate a second current difference;
a second proportional-integral controller coupled to the second subtractor and configured to receive the second current difference and generate a second control voltage according to the second current difference;
a second value limiter coupled to the second proportional-integral controller and configured to receive the second control voltage, wherein the second value limiter outputs the second control voltage when the second control voltage is less than a second upper limit voltage and greater than a second lower limit voltage, the second value limiter outputs the second upper limit voltage when the second control voltage is greater than or equal to the second upper limit voltage, and the second value limiter outputs the second lower limit voltage when the second control voltage is less than or equal to the second lower limit voltage; and
a second pulse width modulation (PWM) generator coupled to the second value limiter and the control terminal of the second electrical switch and configured to receive and compare one of the second control voltage, the second upper limit voltage, and the second lower limit voltage and a second triangle waveform voltage to generate the second PWM signal.

7. The DC voltage-boosting device according to claim 1, wherein the phases of the first PWM signal and the second PWM signal are different by 180 degrees.

8. The DC voltage-boosting device according to claim 1, wherein the phase-shift voltage converter comprises:
a resonant driving circuit coupled to the interleaved voltage booster and the second phase controller and configured to receive the third PWM signals and the supplying DC voltage and convert the supplying DC voltage into a resonant current according to the different phases of the third PWM signals;
a transformer with a primary side thereof coupled to the resonant driving circuit and configured to receive the resonant current to store energy; and
a rectifying circuit coupled to a secondary side of the transformer, wherein the transformer and the rectifying circuit are configured to convert the energy into the stable DC voltage.

9. The DC voltage-boosting device according to claim 8, wherein the resonant driving circuit comprises:
a current switching circuit coupled to the interleaved voltage booster and the second phase controller; and
a resonant circuit coupled to the current switching circuit and the primary side of the transformer, wherein the current switching circuit and the resonant circuit are configured to receive the third PWM signals and the supplying DC voltage and convert the supplying DC voltage into the resonant current according to the different phases of the third PWM signals.

10. The DC voltage-boosting device according to claim 9, wherein the second phase controller comprises:
a subtractor coupled to the interleaved voltage booster and configured to receive the supplying DC voltage and the setting voltage and subtract the supplying DC voltage from the setting voltage to generate a voltage difference;
a proportional-integral controller coupled to the subtractor and configured to receive the voltage difference and generate a phase control amount according to the voltage difference;
a value limiter coupled to the proportional-integral controller and configured to receive the phase control amount, wherein the value limiter outputs the phase control amount when the phase control amount is less than an upper limit control amount and greater than a lower limit control amount, the value limiter outputs the upper limit control amount when the phase control amount is greater than or equal to the upper limit control amount, and the value limiter outputs the lower limit control amount when the phase control amount is less than or equal to the lower limit control amount; and
a pulse width modulation (PWM) generator coupled to the value limiter and the current switching circuit and configured to receive the phase control amount, the upper limit control amount, or the lower limit control amount and generate the third PWM signals according to one of the phase control amount, the upper limit control amount, and the lower limit control amount and a triangle waveform voltage.

11. An energy-recycling device, coupled to a mains power grid, comprising:
a first phase controller configured to receive a constant current, a first feedback current, and a second feedback current and generate a first pulse width modulation (PWM) signal and a second pulse width modulation (PWM) signal according to the constant current, the first feedback current, and the second feedback current, wherein phases of the first PWM signal and the second PWM signal are different from each other;
an interleaved voltage booster coupled to the first phase controller and configured to receive an input direct-current (DC) voltage, the first PWM signal, and the second PWM signal and output the first feedback current and the second feedback current according to the input DC voltage, the first PWM signal, and the second PWM signal, wherein the interleaved voltage booster is configured to boost the input DC voltage to a supplying direct-current (DC) voltage according to the phases of the first PWM signal and the second PWM signal;

a second phase controller coupled to the interleaved voltage booster and configured to receive the supplying DC voltage and a setting voltage and generate third pulse width modulation (PWM) signals according to the supplying DC voltage and the setting voltage, wherein the third PWM signals have different phases;

a phase-shift voltage converter coupled to the interleaved voltage booster and the second phase controller and configured to receive the third PWM signals and the supplying DC voltage and convert the supplying DC voltage into a stable direct-current (DC) voltage according to the different phases of the third PWM signals; and an inverter coupled to the phase-shift voltage converter and the mains power grid and configured to receive the stable DC voltage, convert the stable DC voltage into an alternating-current (AC) voltage, and transmit the AC voltage to the mains power grid.

12. The energy-recycling device according to claim 11, further comprising a current controller coupled to the first phase controller and configured to generate the constant current.

13. The energy-recycling device according to claim 12, wherein the current controller is coupled to the first phase controller through a controller area network bus.

14. The energy-recycling device according to claim 11, further comprising a voltage controller coupled to the second phase controller and configured to receive the input DC voltage and generate the setting voltage according to the input DC voltage.

15. The energy-recycling device according to claim 11, wherein the interleaved voltage booster comprises:
  a first diode and a second diode;
  a first electrical switch coupled between an anode of the first diode and a grounding terminal, wherein a control terminal of the first electrical switch is coupled to the first phase controller, and the first electrical switch is configured to receive the first PWM signal to be turned on or turned off;
  a second electrical switch coupled between an anode of the second diode and the grounding terminal, wherein a control terminal of the second electrical switch is coupled to the first phase controller, and the second electrical switch is configured to receive the second PWM signal to be turned on or turned off;
  a first inductor with an end thereof coupled between the anode of the first diode and the first electrical switch, and another end of the first inductor is coupled to the first phase controller, wherein the first inductor is configured to receive the input DC voltage and generate the first feedback current and a first inductor current according to the input DC voltage;
  a second inductor with an end thereof coupled between the anode of the second diode and the second electrical switch, and another end of the second inductor is coupled to the first phase controller, wherein the second inductor is configured to receive the input DC voltage and generate the second feedback current and a second inductor current according to the input DC voltage; and
  an output capacitor with an end thereof coupled to cathodes of the first diode and the second diode and the second phase controller, and another end of the output capacitor is coupled to the grounding terminal, wherein the output capacitor is configured to receive the first inductor current and the second inductor current through the first diode and the second diode to generate the supplying DC voltage according to ON or OFF states of the first electrical switch and the second electrical switch.

16. The energy-recycling device according to claim 15, wherein the first phase controller comprises:
  a first subtractor coupled to the first inductor and configured to receive the first feedback current and the constant current and subtract the first feedback current from the constant current to generate a first current difference;
  a first proportional-integral controller coupled to the first subtractor and configured to receive the first current difference and generate a first control voltage according to the first current difference;
  a first value limiter coupled to the first proportional-integral controller and configured to receive the first control voltage, wherein the first value limiter outputs the first control voltage when the first control voltage is less than a first upper limit voltage and greater than a first lower limit voltage, the first value limiter outputs the first upper limit voltage when the first control voltage is greater than or equal to the first upper limit voltage, and the first value limiter outputs the first lower limit voltage when the first control voltage is less than or equal to the first lower limit voltage;
  a first pulse width modulation (PWM) generator coupled to the first value limiter and the control terminal of the first electrical switch and configured to receive and compare one of the first control voltage, the first upper limit voltage, and the first lower limit voltage and a first triangle waveform voltage to generate the first PWM signal;
  a second subtractor coupled to the second inductor and configured to receive the second feedback current and the constant current and subtract the second feedback current from the constant current to generate a second current difference;
  a second proportional-integral controller coupled to the second subtractor and configured to receive the second current difference and generate a second control voltage according to the second current difference;
  a second value limiter coupled to the second proportional-integral controller and configured to receive the second control voltage, wherein the second value limiter outputs the second control voltage when the second control voltage is less than a second upper limit voltage and greater than a second lower limit voltage, the second value limiter outputs the second upper limit voltage when the second control voltage is greater than or equal to the second upper limit voltage, and the second value limiter outputs the second lower limit voltage when the second control voltage is less than or equal to the second lower limit voltage; and
  a second pulse width modulation (PWM) generator coupled to the second value limiter and the control terminal of the second electrical switch and configured to receive and compare one of the second control voltage, the second upper limit voltage, and the second lower limit voltage and a second triangle waveform voltage to generate the second PWM signal.

17. The energy-recycling device according to claim 11, wherein the phases of the first PWM signal and the second PWM signal are different by 180 degrees.

18. The energy-recycling device according to claim 11, wherein the phase-shift voltage converter comprises:
- a resonant driving circuit coupled to the interleaved voltage booster and the second phase controller and configured to receive the third PWM signals and the supplying DC voltage and convert the supplying DC voltage into a resonant current according to the different phases of the third PWM signals;
- a transformer with a primary side thereof coupled to the resonant driving circuit and configured to receive the resonant current to store energy; and
- a rectifying circuit coupled to a secondary side of the transformer and the inverter, wherein the transformer and the rectifying circuit are configured to convert the energy into the stable DC voltage.

19. The energy-recycling device according to claim 18, wherein the resonant driving circuit comprises:
- a current switching circuit coupled to the interleaved voltage booster and the second phase controller; and
- a resonant circuit coupled to the current switching circuit and the primary side of the transformer, wherein the current switching circuit and the resonant circuit are configured to receive the third PWM signals and the supplying DC voltage and convert the supplying DC voltage into the resonant current according to the different phases of the third PWM signals.

20. The energy-recycling device according to claim 19, wherein the second phase controller comprises:
- a subtractor coupled to the interleaved voltage booster and configured to receive the supplying DC voltage and the setting voltage and subtract the supplying DC voltage from the setting voltage to generate a voltage difference;
- a proportional-integral controller coupled to the subtractor and configured to receive the voltage difference and generate a phase control amount according to the voltage difference;
- a value limiter coupled to the proportional-integral controller and configured to receive the phase control amount, wherein the value limiter outputs the phase control amount when the phase control amount is less than an upper limit control amount and greater than a lower limit control amount, the value limiter outputs the upper limit control amount when the phase control amount is greater than or equal to the upper limit control amount, and the value limiter outputs the lower limit control amount when the phase control amount is less than or equal to the lower limit control amount; and
- a pulse width modulation (PWM) generator coupled to the value limiter and the current switching circuit and configured to receive the phase control amount, the upper limit control amount, or the lower limit control amount and generate the third PWM signals according to one of the phase control amount, the upper limit control amount, and the lower limit control amount and a triangle waveform voltage.

* * * * *